Nov. 27, 1951  L. L. WILSON, JR  2,576,867
SAFETY HARNESS
Filed Sept. 25, 1950
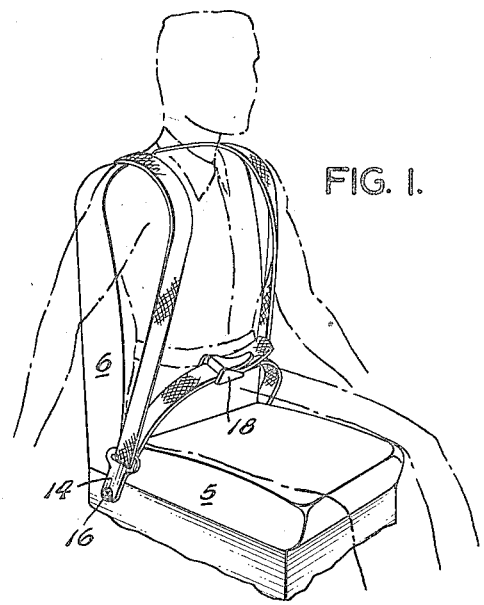
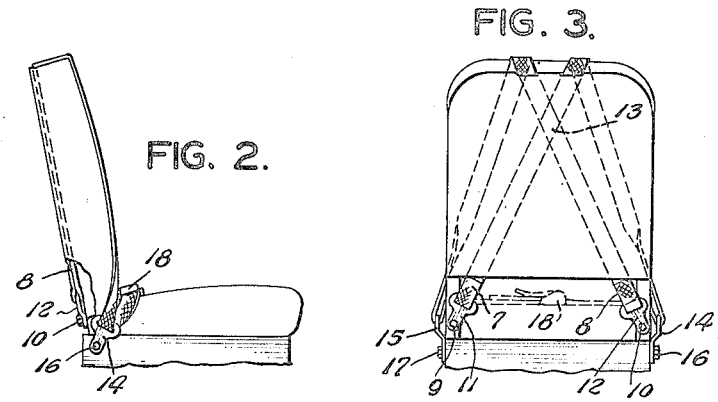
*INVENTOR.*
LEONARD LEE WILSON, JR.
BY
ATTORNEY Patented Nov. 27, 1951

2,576,867

UNITED STATES PATENT OFFICE 2,576,867

SAFETY HARNESS

Leonard Lee Wilson, Jr., Wichita, Kans., assignor to Beech Aircraft Corporation, Wichita, Kans., a corporation of Delaware Application September 25, 1950, Serial No. 186,553

3 Claims. (Cl. 155—189)

The invention disclosed herein is a safety harness for the occupants of vehicles such as airplanes and automobiles.

Objects of the invention are to provide a harness which will combine the holding effects of the seat belts and shoulder straps now commonly used on aircraft but which will be so simple and easy to get into and get out of as to be fully acceptable to the users of aircraft and other fast travelling vehicles.

Particularly it is a purpose of the invention to provide a harness structure having the attributes mentioned which while providing the desired safety and restraint, will not interfere with the comfort or normal freedom of the occupant of a seat and which withal will not be distasteful or alarming in appearance.

In line with the last mentioned, it is a purpose of the invention to provide this safety harness in a form which will fit closely to the back of the seat and not impair decorative features or the general ornamental appearance of a seat.

A particularly important object of the invention is to provide a combination shoulder and belt form of harness which will require only a single fastening and which will be self-adjusting or compensating in character so as to meet any restraining needs encountered as between holding effects required for the shoulders and across the lap.

Further special objects are to provide a harness which with the same single fastening may be employed either as a full body harness or simply as a safety belt only and which may be used with different kinds of seats, such as those of the rigid seat back and the folding back types.

Other desirable objects and the novel features through which all purposes of the invention are attained are set forth or will appear in the course of the following specification.

The drawing accompanying and forming part of the specification illustrates a present commercial embodiment of the invention. Structure, however, may be modified and changed, all within the true intent and scope of the invention as hereinafter defined and claimed.

Fig. 1 in the drawing is a broken perspective view of the harness applied to and in use on an airplane seat;

Fig. 2 is a broken side view of the seat showing the harness pulled down flat and tight over the seat in a position of non-use;

Fig. 3 is a broken rear view of the same.

In the several views a typical airplane seat is illustrated, consisting in the main of a seat proper 5 and a back 6. The latter may be considered either as rigid or hinged to fold forwardly, as such seats are often constructed.

The harness comprises two straps 7 and 8, anchored at opposite sides of and in back of and at the base of the back, as at 9 and 10, Fig. 3.

In the illustration these two straps are of woven webbing and the attachment means for the ends are simply flat loops 11 and 12 through which the ends of the webbing are passed and stitched or otherwise secured, said loops being held by the bolts or other anchorage securing means 9 and 10.

From the anchorage points the straps extend oppositely up the back of the back, diagonally on convergent lines crossing at 13, Fig. 3, just below the top of the back or approximately below the shoulder level of the seat occupant.

The straps, after crossing at the back, extend forward over the top and thence downward over the front of the back to and through the slidingly confining strap guides 14, 15, secured at 16, 17, at the opposite sides of the seat close to the lower portion of the back.

These confining guides are shown as flat loops having straight upper edges beneath which the straps may slide freely and which, in the generally horizontal but possibly somewhat forwardly inclined position shown, will slidingly direct the straps into position to extend flat across the lap region of the occupant of the seat.

The free ends of the belt forming portions of the straps are shown connected by an adjustable buckle 18 which may be of any usual or special, quick opening and easy adjustable type.

When the harness is not to be used the buckle may be tightened to pull the straps smooth and flat, down over the back and across the seat at the foot of the back so as to be practically entirely out of the way.

If the device is to be used simply as a seat belt the buckle may be opened, and with the shoulder confining portions left flat against the back, the belt forming portions may be connected and adjusted across the lap of the seat occupant. In this condition the shoulder straps are entirely out of the way and the occupant has the use of the device as a quickly applied and easily adjusted seat belt.

When the device is to be used as a full body harness, the occupant has only to pass the arms and shoulders beneath the upright shoulder portions of the straps and then draw the ends of the straps together across the lap in ordinary seat belt fastening fashion.

The convergent arrangement of the straps at the back and the divergent arrangement at the front causes the straps to flare out to the sides in passing over the shoulders, thus to securely confine without uncomfortably restraining the shoulders and assuring the holding of the occupant against any slippage possibilities.

By the sliding interconnection between the shoulder confining and pelvic confining portions, the load on the straps is distributed so as to safely and securely hold the body without imposing uncomfortable or injurious loading on local portions of the body.

The single fastening for the ends of the straps enables a person to quickly get into or out of the harness, either in the complete holding form or just as a seat belt, and to easily make adjustments at any time to suit comfort or needs. The divergent arrangement of the shoulder straps at the front of the seat back enables quick and easy changing at any time to either the full holding use or only the seat belt holding use of the device, without need of the occupant getting up from the seat.

In addition to the many practical advantages pointed out, the invention is light in weight, relatively inexpensive and readily applied to existing seat structures, or to be built into special seats designed with such end in view.

What is claimed is:

1. A combined seat belt and shoulder harness usable alternatively as a seat belt alone and having a single fastening and common slack take-up for both the seat belt and shoulder harness forming portions of the device and comprising, in combination with a seat having a back, strap guides adjacent the lower opposite edge portions of said seat back, straps extending from the upper, generally central portion of the seat back diagonally downwardly across the opposite corner portions of the back to form shoulder confining portions and extending in continuing, free sliding relation through said guides, across the seat, to form seat belt extension portions of said shoulder confining portions, and readily releasable means for quickly connecting the ends of said straps together as drawn through said guides for applying desired tension to both said shoulder confining and seat belt forming portions or for securing said strap ends together as tensioned to pull said shoulder confining portions flat against the back when using only the seat belt forming portions of the device.

2. A combined seat belt and shoulder harness usable alternatively as a seat belt alone and having a single fastening and common slack take-up for both the seat belt and shoulder harness forming portions of the device and comprising, in combination with a seat having a back, strap guides adjacent the lower opposite edge portions of said seat back, straps extending from the upper, generally central portion of the seat back diagonally downwardly across the opposite corner portions of the back to form shoulder confining portions and extending in continuing, free sliding relation through said guides, across the seat, to form seat belt extension portions of said shoulder confining portions, and readily releasable means for quickly connecting the ends of said straps together as drawn through said guides for applying desired tension to both said shoulder confining and seat belt forming portions or for securing said strap ends together as tensioned to pull said shoulder confining portions flat against the back when using only the seat belt forming portions of the device, said strap guides being in the form of upright open loops for passage of the straps therethrough and having substantially straight strap confining and guiding upper edges inclined forwardly from the horizontal to turn the straps passing therethrough from the substantially vertical relation down over the front of the back, to the substantially horizontal relation across the seat.

3. A combined seat belt and shoulder harness usable alternatively as a seat belt alone and having a single fastening and common slack take-up for both the seat belt and shoulder harness forming portions of the device and comprising, in combination with a seat having a back, strap guides adjacent the lower opposite edge portions of said seat back, straps extending from the upper, generally central portion of the seat back diagonally downwardly across the opposite corner portions of the back to form shoulder confining portions and extending in continuing, free sliding relation through said guides, across the seat, to form seat belt extension portions of said shoulder confining portions, and readily releasable means for quickly connecting the ends of said straps together as drawn through said guides for applying desired tension to both said shoulder confining and seat belt forming portions or for securing said strap ends together as tensioned to pull said shoulder confining portions flat against the back when using only the seat belt forming portions of the device, said straps being anchored at opposite sides in back of the seat back and extending diagonally upwardly in convergent crossing relation up over the back of the seat back and thence downwardly over the front of the seat back in the diagonally divergent relation first mentioned.

LEONARD LEE WILSON, Jr.

REFERENCES CITED

The following references are of record in the file of this patent:

UNITED STATES PATENTS

| Number | Name | Date |
|---|---|---|
| 1,369,456 | Meredith | Feb. 22, 1921 |
| 1,971,264 | Irwin | Aug. 21, 1934 |
| 1,991,633 | Serpico | Feb. 19, 1935 |
| 2,252,357 | Shaw | Aug. 12, 1941 |
| 2,275,450 | Manson | Mar. 10, 1942 |
| 2,365,625 | Carlisle | Dec. 19, 1944 |